(12) United States Patent
Mäkelä et al.

(10) Patent No.: US 12,292,379 B2
(45) Date of Patent: May 6, 2025

(54) SPLIT REFRACTING OR SPLIT REFLECTING LIGHT RECEIVED BY CELLULOSE-BASED FILM COMPRISING SURFACE PATTERN

(71) Applicant: Teknologian tutkimuskeskus VTT Oy, Espoo (FI)

(72) Inventors: Tapio Mäkelä, Espoo (FI); Ari Hokkanen, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 151 days.

(21) Appl. No.: 17/774,704

(22) PCT Filed: Nov. 5, 2020

(86) PCT No.: PCT/FI2020/050731
§ 371 (c)(1),
(2) Date: May 5, 2022

(87) PCT Pub. No.: WO2021/089921
PCT Pub. Date: May 14, 2021

(65) Prior Publication Data
US 2022/0397524 A1    Dec. 15, 2022

(30) Foreign Application Priority Data

Nov. 5, 2019 (FI) ...................... 20195952

(51) Int. Cl.
*G01N 21/47* (2006.01)
*G01N 21/81* (2006.01)

(52) U.S. Cl.
CPC ......... *G01N 21/4788* (2013.01); *G01N 21/81* (2013.01)

(58) Field of Classification Search
CPC ...... G06T 7/00; G01N 21/4788; G01N 21/81; G01N 21/41; G01N 33/54373; G01B 11/00; G01B 11/04; G01B 11/165
(Continued)

(56) References Cited

U.S. PATENT DOCUMENTS

| 6,180,288 B1 | 1/2001 | Everhart et al. |
| 2010/0120116 A1 | 5/2010 | Kaplan et al. |

(Continued)

FOREIGN PATENT DOCUMENTS

| JP | 62102139 | 5/1987 |
| JP | 2011526359 A | 10/2011 |

(Continued)

OTHER PUBLICATIONS

Saito et al. Homogeneous Suspensions of Individualized Microfibrils from TEMPO-Catalyzed Oxidation of Native Cellulose, Biomacromolecules, 2006, 7 (6), pp. 1687-1691.
(Continued)

*Primary Examiner* — Hoa Q Pham
(74) *Attorney, Agent, or Firm* — Meunier Carlin & Curfman LLC (57) ABSTRACT

There is provided detecting modification of optically active cellulose-based film. A method comprises split refracting or split reflecting light received by a surface pattern of an optically active cellulose-based film into a plurality of output light patterns, wherein an output light pattern is determined from the plurality of output light patterns on the basis of a modification applied to the optically active cellulose-based film.

14 Claims, 4 Drawing Sheets

302 split refracting or split reflecting light received by a surface pattern of an optically active cellulose-based film into a plurality of output light patterns, wherein an output light pattern is determined from the plurality of output light patterns on the basis of a modification applied to the optically active cellulose-based film (58) Field of Classification Search
USPC .............. 356/432–440, 625; 435/288.7; 422/82.05
See application file for complete search history.

(56) References Cited

U.S. PATENT DOCUMENTS

| | | |
|---|---|---|
| 2010/0120166 A1 | 5/2010 | Ozaki et al. |
| 2011/0214600 A1 | 9/2011 | Hurme et al. |
| 2012/0070885 A1* | 3/2012 | Lenhert ............. G01N 21/6452 422/82.05 |
| 2012/0288785 A1 | 11/2012 | Naydenova et al. |
| 2013/0063602 A1 | 3/2013 | Scapier |
| 2013/0330710 A1 | 12/2013 | Omenetto et al. |
| 2015/0272903 A1 | 10/2015 | Amsden et al. |
| 2015/0300958 A1 | 10/2015 | Hajime et al. |
| 2017/0038295 A1 | 2/2017 | Burgess et al. |
| 2018/0346778 A1* | 12/2018 | Long .................... C09D 189/00 |
| 2022/0118676 A1* | 4/2022 | Mäkelä ................. C08J 9/125 |

FOREIGN PATENT DOCUMENTS

| | | |
|---|---|---|
| JP | 6357270 B1 | 7/2018 |
| JP | 2019-501255 | 1/2019 |
| JP | 2019157007 A | 9/2019 |
| WO | 20080127402 | 10/2008 |
| WO | 20100126640 | 11/2010 |
| WO | 20120054121 | 4/2012 |
| WO | 2017115020 | 7/2017 |

OTHER PUBLICATIONS

Peng et al, Micro hot embossing of thermoplastic polymers; a review, 2014 J. Micromech. Microeng. 24 013001.

Mäkelä et al; Fabrication of micropillars on nanocellulose films using a roll-to-roll nanoimprinting method, Microelectronic Engineering, vol. 163, Sep. 1, 2016, pp. 1-6.

Chou et al, Nanoimprint lithography J. Vac. Sci. Technol. B, 14 (6) (1996), pp. 4129-4133.

Toru Yasaku, Printable Humidity Sensor with Cellulose Nanofibers, The 32nd Electronics Packaging Academic Conference, 6A1-4, 20819, pp. 8-9, https://doi.org/10.11486/ejisso.32.0_8 (document showing well-known art; newly cited document).

Office Action in corresponding Japanese patent application 2022-526125, communicated on Feb. 25, 2025.

* cited by examiner

Fig. 1a　　　　　　　　　　Fig. 1b

Fig. 2a　　　　　　　　　　Fig. 2b 302 split refracting or split reflecting light received by a surface pattern of an optically active cellulose-based film into a plurality of output light patterns, wherein an output light pattern is determined from the plurality of output light patterns on the basis of a modification applied to the optically active cellulose-based film

Fig. 3

402 capturing data from an optically active cellulose-based film located in a field of view of the optical position sensor device 404 determining the modification applied to the optically active cellulose-based film on the basis of the captured data indicating a change of one or more output light patterns, in response to the modification applied to the optically active cellulose-based film

Fig. 4

502 performing at least one user interface action in response to the determined modification

SPLIT REFRACTING OR SPLIT REFLECTING LIGHT RECEIVED BY CELLULOSE-BASED FILM COMPRISING SURFACE PATTERN

CROSS REFERENCE TO RELATED APPLICATIONS

This application is a United States National Phase Patent Application of International Patent Application Number PCT/FI2020/050731, filed on Nov. 5, 2020, which claims the benefit of priority to Finnish National Patent Application number FI 20195952, filed on Nov. 5, 2019, both of which are incorporated by reference herein in their entireties.

TECHNICAL FIELD

The present invention relates to split refracting or split reflecting light received by a cellulose-based film comprising a surface pattern.

BACKGROUND

This section is intended to provide a background or context to the invention that is recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

Cellulose-based films are biodegradable and transparent. In many applications, the cellulose-based films are exposed to various conditions that may have an adverse effect on the cellulose-based film or to products that close to the cellulose-based film. The various conditions may be left undetected and unnoticed and in such a case also their adverse effects may be left unnoticed. Detection of the conditions is important at least in applications, where reliable product quality is wanted.

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect there is provided an apparatus comprising an optical position sensor device and a processor, wherein the processor is configured to: control the optical position sensor device to capture data from an optically active cellulose-based film located in a field of view of the optical position sensor device, the optically active cellulose-based film comprising a surface pattern configured to split refract or split reflect light received by the surface pattern into a plurality of output light patterns, wherein an output light pattern is determined from the plurality of output light patterns on the basis of a modification applied to the optically active cellulose-based film; and determine the modification applied to the optically active cellulose-based film on the basis of the captured data indicating a change of one or more output light patterns, in response to the modification applied to the optically active cellulose-based film.

According to a second aspect there is provided a method comprising:
capturing data from an optically active cellulose-based film located in a field of view of an optical position sensor device, the optically active cellulose-based film comprising a surface pattern configured to split refract or split reflect light received by the surface pattern into a plurality of output light patterns, wherein an output light pattern is determined from the plurality of output light patterns on the basis of a modification applied to the optically active cellulose-based film; and determining the modification applied to the optically active cellulose-based film on the basis of the captured data indicating a change of one or more output light patterns, in response to the modification applied to the optically active cellulose-based film.

According to a third aspect there is provided an optically active cellulose-based film comprising:
a surface pattern configured to split refract or split reflect light received by the surface pattern into a plurality of output light patterns, wherein an output light pattern is determined from the plurality of output light patterns on the basis of a modification applied to the optically active cellulose-based film.

According to a fourth aspect there is provided a method comprising:
split refracting or split reflecting light received by a surface pattern of an optically active cellulose-based film into a plurality of output light patterns, wherein an output light pattern is determined from the plurality of output light patterns on the basis of a modification applied to the optically active cellulose-based film.

According to a fifth aspect there is provided a computer program comprising computer readable program code means adapted to perform at least the following:
capturing data from an optically active cellulose-based film located in a field of view of an optical position sensor device, the optically active cellulose-based film comprising a surface pattern configured to split refract or split reflect light received by the surface pattern into a plurality of output light patterns, wherein an output light pattern is determined from the plurality of output light patterns on the basis of a modification applied to the optically active cellulose-based film; and determining the modification applied to the optically active cellulose-based film on the basis of the captured data indicating a change of one or more output light patterns, in response to the modification applied to the optically active cellulose-based film.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

There is provided split refracting or split reflecting light received by a surface pattern of an optically active cellulose-based film into a plurality of output light patterns, wherein an output light pattern is determined from the plurality of output light patterns on the basis of a modification applied to the optically active cellulose-based film. In this way the optically active cellulose-based film may serve for detecting modifications applied to the optically active cellulose-based film. The optically active cellulose-based film may be utilized in various applications including but not limited to sensors such as humidity sensors, color selection in greenhouse films, increase of light scattering in greenhouse films, biodegradable diffractive elements, polarization based light filtering, polarization based sensor, laser beam steering by heating or wavelength tuning, where laser beam angle is temperature or wavelength dependent, microlens light collimation and/or dispersion with diffraction grating color filtering.

A cellulose-based film may be a polymeric cellulose-based, fibrillated cellulose-based, or fiber cellulose-based film. A nanofibrillated cellulose-based film may refer to fibrillated cellulose-based film comprising cellulose fibers with nanoscale diameter and a narrow size distribution of the fibers. Similarly, a nanofiber cellulose-based film may refer to fiber cellulose-based film comprising cellulose fibers with nanoscale diameter and a narrow size distribution of the fibers. Examples of cellulose-based films comprise a cellulose nanofibril (CNF) film, a nanofibrillated cellulose film and a TEMPO-oxidized CNF (TEMPO-CNF) film. Cellulose-based films have applications in packaging industry, electronics and diagnostics. The CNF may be produced from mechanical disintegration of bleached hardwood kraft pulp that is commercially available. TEMPO-oxidized cellulose nanofibrils (TEMPO-CNFs) may be produced from dried, bleached softwood kraft pulp. The softwood kraft pulp may be TEMPO-oxidized, where oxidation is mediated by 2,2,6,6-tetramethylpiperidine-1-oxyl (TEMPO) radical. The TEMPO-oxidation may follow a protocol described by Saito et al. in "Homogeneous Suspensions of Individualized Microfibrils from TEMPO-Catalyzed Oxidation of Native Cellulose", Biomacromolecules, 2006, 7 (6), pp 1687-1691 DOI: 10.1021/bm060154s Publication Date (Web): May 3, 2006. Further details of CNF and TEMPO-CNF film preparation may be referred to in Section 2.1 of Mäkelä et al. referenced below.

An optically active cellulose-based film may be configured to receive light and split refract or split reflect the received light for outputting an output light pattern. The light may be received from a Light Emitting Diode (LED), a light bulb, laser, or other form of light source that may have a color that facilitates interaction with the user, for example in a specific environment. The optically active cellulose-based film may be configured to split refract or to split reflect the received light into a plurality of output light patterns. Split refracting the received light comprises that the light received by the optically active cellulose-based film travels at least partly through the optically active cellulose-based film. Then, light output by the optically active cellulose-based film is refracted and split into two or more color components. Split reflecting the received light comprises that the light received by the optically active cellulose-based film is reflected at least partly by the optically active cellulose-based film. Then, light output by the optically active cellulose-based film is reflected and split into two or more color components. An output light pattern of the plurality of output light patterns may be determined on the basis subjecting the optically active cellulose-based film to a modification that causes a change of the properties of the optically active cellulose-based film. Changing the properties of the optically active cellulose-based film controls the split refraction or split reflection, whereby an output light pattern of the optically active cellulose-based film may be determined on the basis of the modification.

Modification of an optically active cellulose-based may be determined on the basis of a comparison of one or more output light patterns or data indicating one or more output light patterns. Accordingly, it should be appreciated that, instead of output light patterns also data indicating output light patterns may be sufficient in various examples and embodiments described herein for determining a modification. In an example, one or more preceding output light patterns may be compared with one or more subsequent output light patterns. A comparison between shapes and/or positions of the one or more preceding output light patterns and shapes and/or positions of the one or more subsequent output light patterns may be used to determine a one or more changes of the output light patterns, whereby at least one modification of the optically active cellulose-based film may be determined, at least based on the differences of the shapes and/or positions of the subsequent output light patterns and the preceding output light patterns. In an example, a modification of the optically active cellulose-based film causes a change of properties of the optically active cellulose-based film. Examples of the properties of the optically active cellulose-based film comprise at least a change of dimensions of the three-dimensional (3D) structure of the surface patterns of the optically active cellulose-based film and a change of refractive index of the optically active cellulose-based film. The change of dimensions and/or the refractive index may cause that one or more preceding output light patterns are changed and a comparison between the preceding output light patterns with one or more subsequent output light patterns may be used to determine a modification of the optically active cellulose-based film. Examples of modifications of the optically active cellulose-based film comprise at least that the optically active cellulose-based film is subjected to one of more of water, Ultra Violet (UV) light, radiation, temperature, strain and other material or molecules disposed on the surface pattern of the optically active cellulose-based film.

Examples of output light patterns comprise geometrical patterns. The light may be divided into color components that form the output light pattern. The light may be monochromatic light, e.g. a laser, or the light may comprise more than one color, e.g. white light.

A surface pattern of an optically active cellulose-based film may comprise micro/nano scale three-dimensional (3D) structure, e.g. pillars or a grating. Accordingly, dimensions of the structures, such as height, width, depth and diameter, may vary from nanometer scale to micrometer scale.

It should be appreciated that cellulose fibers of the optically active cellulose-based film may be aligned in the same direction, whereby the optically active cellulose-based film is polarization sensitive and birefringent so that refractive index is different to different directions.

A microlens may refer to an optically active cellulose-based material configured to enhance light collimation, dispersion and/or filtering.

Figure 1A:
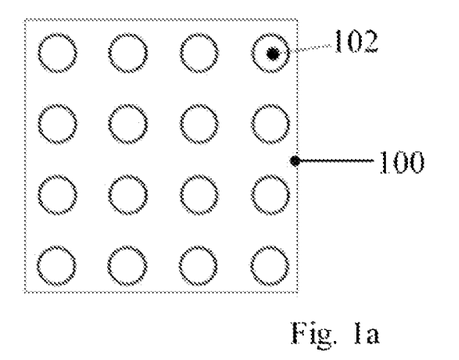
FIG. 1a, FIG. 1b, FIG. 2a and FIG. 2b illustrate cellulose-based films comprising surface patterns in accordance with at least some embodiments of the present invention.
Figure 1B:
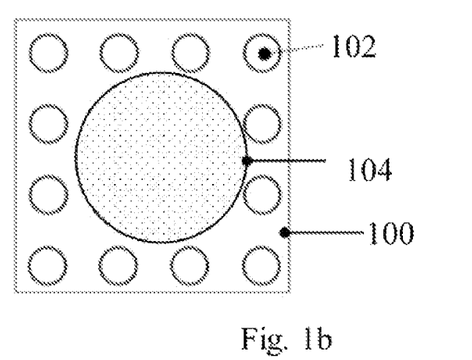
Figure 2A:
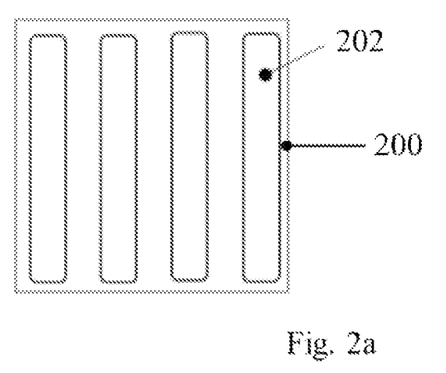
Figure 2B:
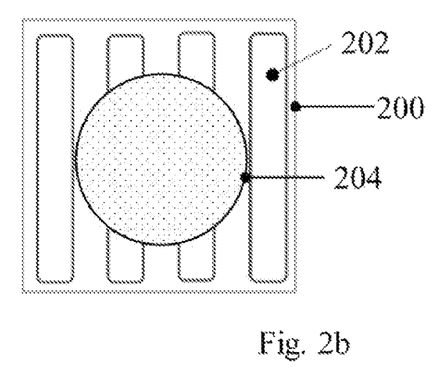

FIG. 1a, FIG. 1b, FIG. 2a, FIG. 2b illustrate surface patterns of optically active cellulose-based films in accordance with at least some embodiments of the present invention. The surface patterns provide that optically active cellulose-based film may split refract or split reflect light and generate an output light pattern. Referring to FIG. 1a and FIG. 1b, a surface pattern of an optically active cellulose-based film 100 comprises micro/nano pillars 102. Referring to FIG. 2a and FIG. 2b, a surface pattern of an optically active cellulose-based film 200 comprises a micro/nano grating 202, i.e. a diffraction grating. Referring to FIG. 1b and FIG. 2b the optically active cellulose-based film comprises one or more microlenses 104, 204. A microlens may be integrated to the optically active cellulose-based film for enhancing light collimation, dispersion and/or filtering.

In an example a microlens 104, 204 may be arranged on one or both sides of the optically active cellulose-based film. When arranged on one side of the optically active cellulose-based film, light entering or leaving the optically active cellulose-based film is collimated or dispersed by the microlens. On the other hand, when arranged on both sides of the optically active cellulose-based film, light entering and light leaving the optically active cellulose-based film may be collimated and/or dispersed by the microlenses.

In an example a microlens 104, 204 may be arranged on the same film with the optically active cellulose-based film and/or a microlens 104, 204 may be arranged on a separate film. When the microlens is arranged on a separate film, the microlens may be laminated on one or both sides of the optically active cellulose-based film.

In an example in accordance with at least some embodiments, absorption of water into the optically active cellulose-based film 100, 200 causes a change of the size of the surface pattern. In an example dimensions of the pillars 102 or the diffraction grating 202 may be changed.

In an example an optically active cellulose-based film 100, 200 comprising micro/nano pillars is manufactured using Nanoimprint lithography (NIL) which also may be referred to hot embossing. NIL is a process for replicating micro- and nanoscale patterns. NIL is an efficient method for fabricating large area nano- and micropatterns on various substances, typically thermoplastics. Details of nanoimprint lithography may be referred to in S. Y. Chou, P. R. Krauss, P. J. Renstrom, Nanoimprint lithography J. Vac. Sci. Technol. B, 14 (6) (1996), pp. 4129-4133. Hot embossing is described e.g. in Micro hot embossing of thermoplastic polymers: a review, Linfa Peng et al 2014 J. Micromech. Microeng. 24 013001.

Manufacturing an optically active cellulose-based film 100, 200 using roll-to-roll (R2R) nanoimprint lithography provides a high-throughput for many industrial-scale applications. "Fabrication of micropillars on nanocellulose films using a roll-to-roll nanoimprinting method", Tapio Mäkelä et al., Microelectronic Engineering, Volume 163, 1 Sep. 2016, Pages 1-6, discloses a method to modify biobased cellulose-based films with thermal roll-to-roll nanoimprinting lithography (R2RNIL) to produce microstructured films. In NIL, a patterned roll and an elastic backing roll are pressed against each other at elevated temperatures, and the pattern is replicated onto the film structure. Height of the replicated pattern are controlled by the temperature, printing speed (contact time to film) and pressure applied in the R2RNIL.

In an embodiment, the optically active cellulose-based film 100, 200 is a polymeric cellulose-based, fibrillated cellulose-based, or fiber cellulose-based film, cellulose nanofibril (CNF), preferably a TEMPO-oxidized cellulose nanofibril (TEMPO-CNF) film.

Figure 3:
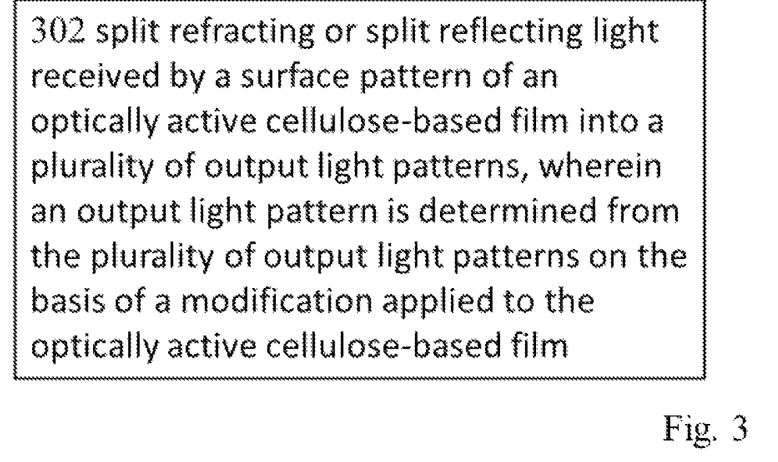
FIG. 3, FIG. 4 and FIG. 5 illustrate methods in accordance with at least some embodiments of the present invention.

Referring to FIG. 3, there is provided a method for supporting detection of modification of an optically active cellulose-based film without movable components. In an example, the method may be performed by an apparatus comprising an optical position sensor device. Phase 302 comprises the optically active cellulose-based film split refracting or split reflecting light received by a surface pattern of the optically active cellulose-based film into a plurality of output light patterns, wherein an output light pattern is determined from the plurality of output light patterns on the basis of a modification applied to the optically active cellulose-based film. The modification of the optically active cellulose-based film controls the split refraction or split reflection, whereby the modification applied to the optically active cellulose-based film may be determined on the basis of a change of the output light patterns or data indicating the output light patterns.

In an example, phase 302 comprises that the optically active cellulose-based film is modified by subjecting the optically active cellulose-based film to water. The optically active cellulose-based film may be subjected to water e.g. by increasing an ambient humidity of the optically active cellulose-based film. The ambient humidity may be increased e.g. by water vapor. When the optically active cellulose-based film is subjected to water, the water is absorbed into the optically active cellulose-based film, thereby increasing a humidity level of the optically active cellulose-based film. In an example, an increased humidity of the optically active cellulose-based film causes that dimensions of the surface pattern of the optically active cellulose-based film are changed, e.g. the optically active cellulose-based film is swollen, whereby split refraction or split reflection performed by the optically active cellulose-based film is modified and thereby the output light pattern is changed.

In an embodiment, in phase 302, the optically active cellulose-based film comprises one or more microlenses for light collimation, dispersion and/or filtering out one or more colors of the light received by the surface pattern. The microlenses may be arranged one or both sides of the optically active cellulose-based film for light collimation, dispersion and/or filtering out one or more colors of the received light.

In an example, phase 302 comprises that the output light patterns correspond to humidity levels. In an example, the output light patterns may change as function of humidity of the optically active cellulose-based film. The output light patterns may change as function of humidity, when the absorbed water changes dimensions of the surface pattern of the optically active cellulose-based film.

In an example, phase 302 comprises that a change of output light pattern comprises a movement and/or a color spectrum widening of the output light pattern.

Figure 4:
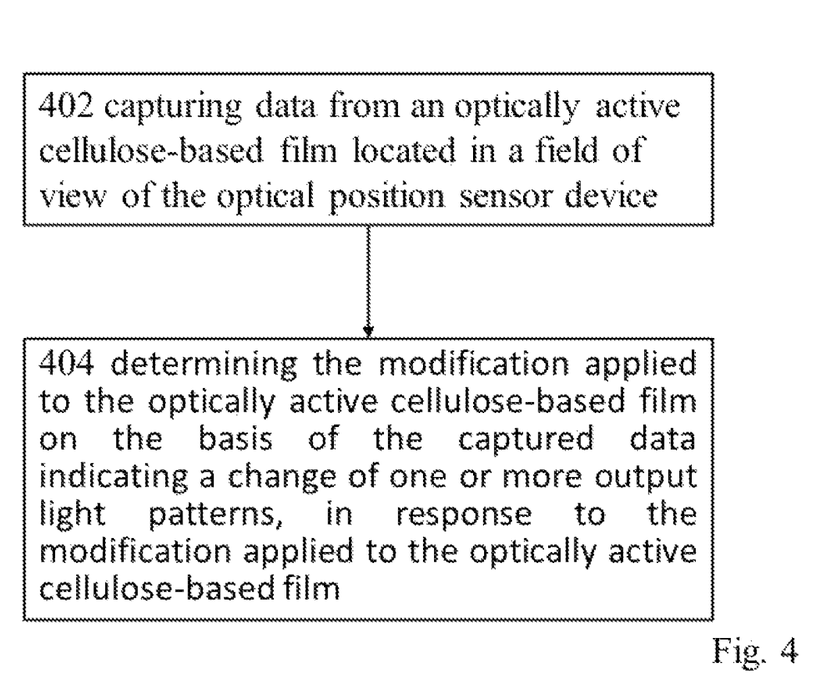

Referring to FIG. 4, there is provided a method by an apparatus comprising an optical position sensor device. Phase 402 comprises capturing data from an optically active cellulose-based film located in a field of view of the optical position sensor device. The optically active cellulose-based film comprises a surface pattern configured to split refract or split reflect light received by the surface pattern into a plurality of output light patterns, wherein an output light pattern is determined from the plurality of output light patterns on the basis of a modification applied to the optically active cellulose-based film. Phase 404 comprises determining the modification applied to the optically active cellulose-based film on the basis of the captured data indicating a change of one or more output light patterns, in response to the modification applied to the optically active cellulose-based film. In an example of the modification, absorption of water into the optically active cellulose-based film provides that dimensions of the surface pattern of the optically active cellulose-based film are changed. The changes of the surface pattern change the output light pattern, whereby the modification may be determined to be a humidity level or a changed humidity level of the optically active cellulose-based film. Therefore, the optically active cellulose-based film may be used by the apparatus serving as a humidity sensor.

In an embodiment, phase 404 comprises that the output light patterns correspond to different humidity levels. In an example, the output light patterns may change as function of humidity. Examples of different humidity levels comprise at least from 0% to 100%, preferably from 0% to substantially 70% or at least almost 70% for observing a linear change of output light patterns. On the other hand, examples of different humidity levels for applications, where a relatively high change in output light pattern is preferred, e.g. an ON/OFF-sensor for detecting any or at least most modifications of the output light pattern, comprise 70% to 99%. In an example, the output light patterns may change as function of humidity, when the absorbed water changes dimensions of the surface pattern of the optically active cellulose-based film.

In an example, phase 404 comprises determining a change of an output light pattern on the basis of a movement and/or a color spectrum widening of the output light pattern in response to the modification.

In an example, phase 402 comprises that the optical position sensor device is a digital camera, executing a camera application and generating a still image of the optically active cellulose-based film located in a field of view of the camera. The camera application may be executed continuously and generating still images. On the other hand, the camera application may be executed discontinuously, e.g. based on triggering of the application e.g. by a timer or other condition. A single image may be sufficient to determine the modification at least when the camera has a sufficiently long exposure time to capture a change of the output light patterns.

In an example, phase 402 comprises that the optical position sensor device is a digital camera, executing a camera application and generating a video clip of the optically active cellulose-based film located in a field of view of the camera. The video provides continuous monitoring of the modification such that a time instant of modification may be determined accurately.

Figure 5:
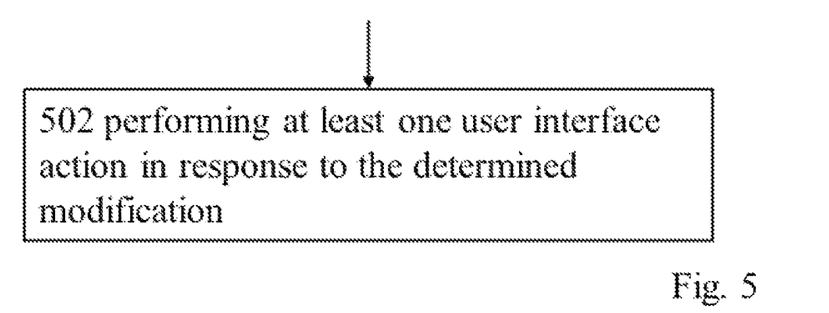

Referring to FIG. 5 there is provided a method by an apparatus comprising an optical position sensor device. The method may be performed in connection with the method of FIG. 4, for example after phase 404. Phase 502 comprises performing at least one user interface action in response to the determined modification. The user interface action provides interaction with the user via the user interface, whereby the user may be notified about the determined modification of the optically active cellulose-based film. In this way the user does not necessarily have to observe the change of output light patterns but thanks to the user interface action the user can still be informed about the modification. It should be appreciated that the user interface provides notifying the user about the modification particularly, when the user does not have knowledge about how to interpret the output light patterns and/or when the output light patterns or their changes are not visible to human eye. In an example a duration of the user interface action may be limited in time, semi-permanent or permanent user interface action. In an example a user interface action limited in time may be sound that is played for a relatively short time period after the optically active cellulose-based film has been modified. In an example a semi-permanent user interface action may be a sound that is stopped after the user enters an acknowledgement of the sound on the user interface. In an example a permanent user interface action may be a sound that is played continuously. Although the foregoing uses a sound as an example, also other user interface actions may be used alternatively or additionally. Further examples of the user interface actions comprise displaying information and/or turning on a light. Examples of the displayed information comprise user interface elements that may comprise graphics or text or a combination thereof. A light may be a Light Emitting Diode (LED), a light bulb, laser, or other form of light source that may have a color that facilitates interaction with the user, for example in a specific environment of the apparatus.

Figure 6:
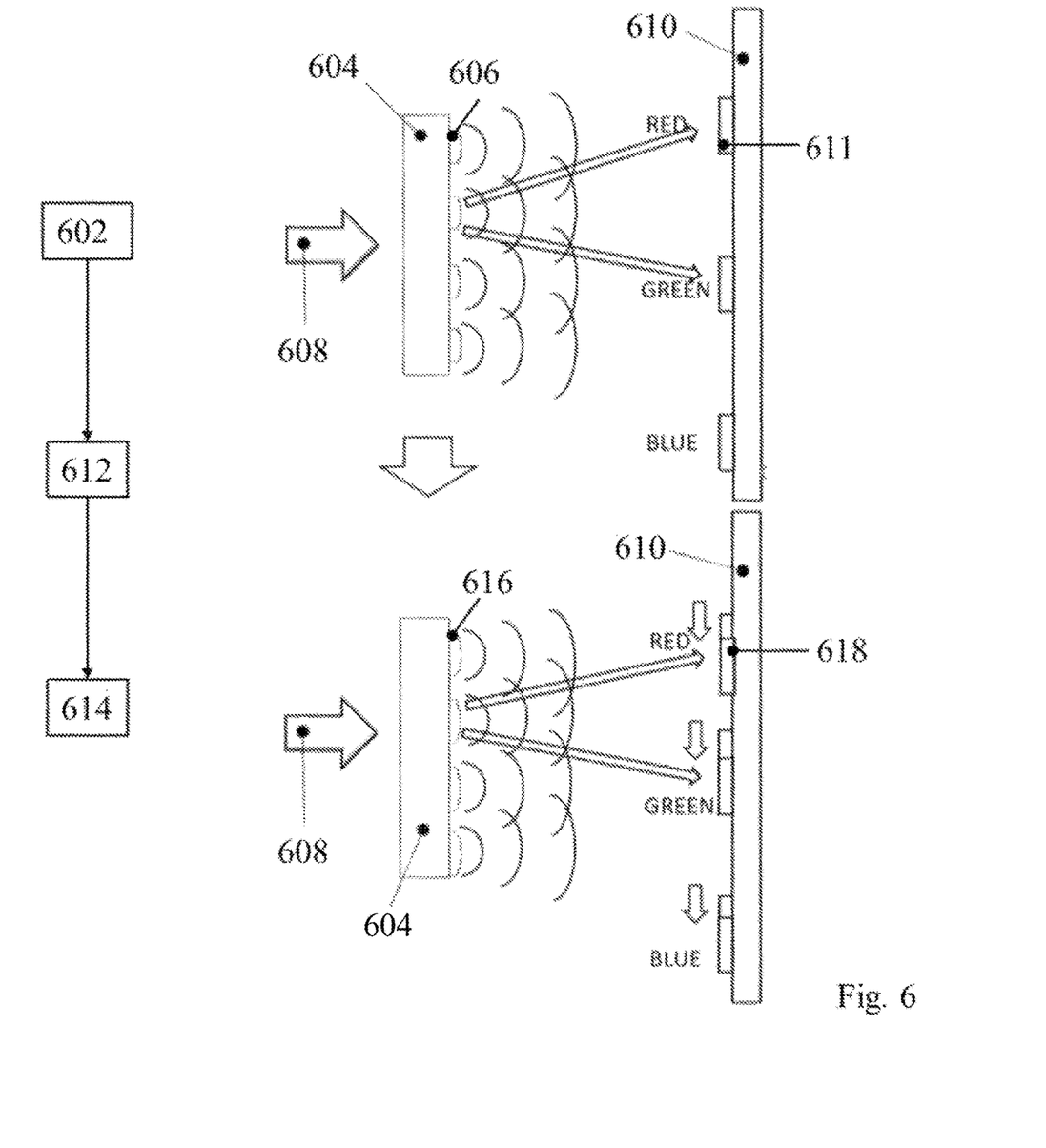
FIG. 6 illustrates change of a surface pattern in accordance with at least some embodiments of the present invention.

FIG. 6 illustrates change of a surface pattern in accordance with at least some embodiments of the present invention. Phase 602 comprises exposing an optically active cellulose-based film 604 comprising a surface pattern 606 to white light 608 that travels through the optically active cellulose-based film. The surface pattern split refracts the white light to an output light pattern 611 on a detector 610. Phase 612 comprises applying one or more modifications to the optically active cellulose-based film by subjecting the optically active cellulose-based film to water, Ultraviolet (UV) light, radiation, temperature, strain and other material or molecules disposed on the surface pattern of the optically active cellulose-based film. In this way the surface pattern 606 may be changed and a new surface pattern 616 may be generated. Phase 614 comprises exposing the optically active cellulose-based film 604 comprising the new surface pattern 616 to white light 608 that travels through the optically active cellulose-based film. The new surface pattern split refracts the white light to a new output light pattern 618 on the detector 610. Accordingly, applying one or more modifications to the optically active cellulose-based film causes a change of the output light pattern 611.

In an example the output light pattern 611, 618 comprises separate areas of different colors on the detector. The colors may comprise red, green and blue light. After the optically active cellulose-based film is modified the output light pattern 611 is changed. In accordance with the arrows next to the detector 610, modifying the optically active cellulose-based film may cause the output light pattern 611 to be moved downwards and thereby a new output light pattern 618 may be generated. It should be appreciated that the detector may comprise a planar surface but also a non-planar surface is feasible. Accordingly, the output light pattern may be moved on the surface of the detector at least in directions, where the surface of the detector extends. It should be appreciated that an image or a video captured by a digital camera may serve as the detector.

Figure 7:
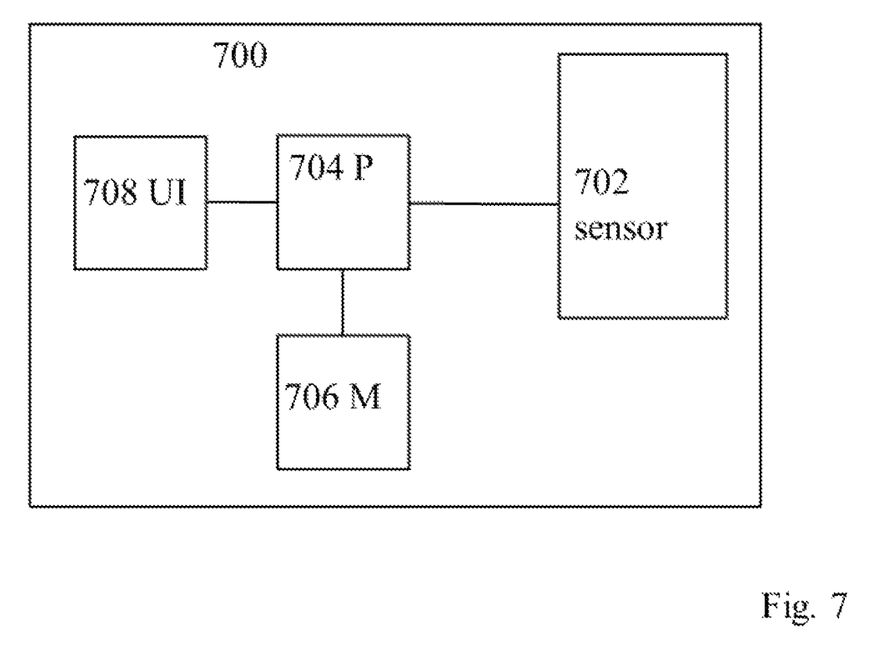
FIG. 7 illustrates a block diagram of an apparatus in accordance with at least some embodiments of the present invention.

Although the change of surface pattern is illustrated in FIG. 7 in connection illustrates split refraction it should be appreciated in accordance with at least some embodiments, one or more output light patterns may be caused by the optically active cellulose-based film split reflecting light.

FIG. 7 illustrates a block diagram of an apparatus in accordance with at least some embodiments of the present invention. The apparatus comprises an optical position sensor device 702 for capturing data, a processor 704, a memory 706 and a user interface 708 that may be connected operatively to cause one or more functionalities described herein. Connections between the optical position sensor device, processor, memory and user interface may be implemented by electrical conductors e.g. on a circuit board.

The data captured by the optical position sensor device may comprise at least information indicating a position of a light pattern or a position of a part of a part of a light pattern. The data provides detecting changes in output light patterns of the optically active cellulose-based film. In an example the data may comprise one or more images or video. The images and video may be digital images and video that may be generated e.g. by the optical position sensor device being a digital camera.

In embodiment, the processor 704 is configured to control the optical position sensor device 702 to capture data from an optically active cellulose-based film located in a field of view of the optical position sensor device, the optically active cellulose-based film comprising a surface pattern configured to split refract or split reflect light into a plurality of output light patterns, wherein an output light pattern is determined from the plurality of output light patterns on the basis of a modification applied to the optically active cellulose-based film, and to determine the modification applied to the optically active cellulose-based film on the basis of the captured data indicating a change of one or more output light patterns, in response to the modification applied to the optically active cellulose-based film.

In an embodiment the apparatus comprises a user interface 708. The processor is configured to control the user interface to perform at least one user interface action in response to the determined change of the surface pattern.

The memory 706 may be a separate memory. On the other hand, the memory may be included to the processor and/or the optical position sensor device. Moreover, the apparatus may comprise a separate memory and memory included to the processor and/or the optical position sensor device.

Examples of the optical position sensor devices 702 comprise devices capable of generating data for detecting positions of optical signals, comprising at least a digital camera, a photocell and a light intensity sensor. The optical position sensor devices may be also referred to matrix detectors or row detectors which have detector elements in two-dimensional array/matrix or in one dimensional line/row. A field of view of the optical position sensor device may be an area of sensitivity of the optical position sensor device, where the optical position sensor device may capture data.

In an example in accordance with at least some embodiments, a processor is configured to control a digital camera to capture at least one image and/or a video from an optically active cellulose-based film located in a field of view of the camera and the processor is configured to determine a modification applied to the optically active cellulose-based film on the basis of the captured at least one image or video indicating a change of one or more output light patterns, in response to the modification applied to the optically active cellulose-based film.

A memory may refer to a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. An apparatus comprising an optical position sensor device for capturing data and a processor, wherein the processor is configured to:
   control the optical position sensor device to capture data from a cellulose nanofibril (CNF) film, when the CNF film is located in a field of view of the optical position sensor device, the CNF film comprising a surface pattern configured to split refract or split reflect light received by the surface pattern into a plurality of output light patterns, wherein an output light pattern is determined from the plurality of output light patterns on the basis of an absorption of water to the CNF film; and determine the absorption of water to the CNF film on the basis of the captured data indicating a change of one or more output light patterns, in response to the absorption of water of the CNF film.

2. The apparatus according to claim 1 comprising:
a user interface, wherein the processor is configured to control the user interface to perform at least one user interface action in response to the determined absorption of water.

3. The apparatus according to claim 1, wherein the CNF film is a TEMPO-oxidized cellulose nanofibril (TEMPO-CNF) film.

4. A method comprising:
capturing data from a cellulose nanofibril(CNF) film located in a field of view of an optical position sensor device, the CNF film comprising a surface pattern configured to
split refract or split reflect light received by the surface pattern into a plurality of output light patterns, wherein an output light pattern is determined from the plurality of output light patterns on the basis of an absorption of water to the CNF film; and
determining the absorption of water to the CNF film on the basis of the captured data indicating a change of one or more output light patterns, in response to the absorption of water to the CNF film.

5. The method according to claim 4, comprising:
performing at least one user interface action for notifying a user in response to the determined absorption of water.

6. The method according to claim 4, wherein the output light patterns correspond to different water contents of the CNF film.

7. A cellulose nanofibril (CNF) film comprising:
a surface pattern configured to
split refract or split reflect light received by the surface pattern into a plurality of output light patterns, wherein an output light pattern is determined from the plurality of output light patterns on the basis of an absorption of water to the CNF film.

8. The CNF film according to claim 7, wherein the CNF film comprises one or more microlenses for light collimation, dispersion and/or filtering out one or more colors of the light received by the surface pattern.

9. A method comprising:
split refracting or split reflecting light received by a surface pattern of a cellulose nanofibril (CNF) film into a plurality of output light patterns, wherein an output light pattern is determined from the plurality of output light patterns on the basis of an absorption of water to the CNF film.

10. The method according to claim 9, wherein the output light patterns correspond to different water contents of the CNF film.

11. The method according to claim 9, wherein one or more colors of the light received by the surface pattern is collimated, dispersed and/or filtered out by one or more microlenses arranged on at least one side of the CNF film.

12. The method according to claim 9, comprising:
absorbing water to the CNF film for causing one or more of:
color selection of the output light patterns;
controlling light scattering;
polarization based laser light filtering;
laser beam steering by wavelength tuning; and/or
microlens light collimation and/or dispersion with surface pattern color filtering.

13. The method according to claim 9, wherein the CNF film is a TEMPO-oxidized cellulose nanofibril (TEMPO-CNF) film.

14. A non-transitory computer readable medium comprising computer readable program code means adapted to perform at least the following:
capturing at least one image or a video from a cellulose nanofibril (CNF) film located in a field of view of an optical position sensor device, the CNF film comprising a surface pattern configured to
split refract or split reflecting light received by the surface pattern into a plurality of output light patterns, wherein an output light pattern is determined from the plurality of output light patterns on the basis of an absorption of water to the CNF film; and
determining the absorption of water to the CNF film on the basis the captured data indicating a change of one or more output light patterns, in response to the absorption of water to the CNF film.

* * * * *